US011740189B2

(12) United States Patent
Griffiths et al.

(10) Patent No.: US 11,740,189 B2
(45) Date of Patent: Aug. 29, 2023

(54) DEFINING PARAMETERS FOR SCAN OF SINGLE CRYSTAL STRUCTURE

(71) Applicant: ROLLS-ROYCE plc, London (GB)

(72) Inventors: Jacqueline Griffiths, Derby (GB); Scott Dufferwiel, Sheffield (GB); Jonathan Eyre, Doncaster (GB)

(73) Assignee: ROLLS-ROYCE PLC, London (GB)

( * ) Notice: Subject to any disclaimer, the term of this patent is extended or adjusted under 35 U.S.C. 154(b) by 450 days.

(21) Appl. No.: 16/932,939

(22) Filed: Jul. 20, 2020

(65) Prior Publication Data

US 2021/0025835 A1 Jan. 28, 2021

(30) Foreign Application Priority Data

Jul. 24, 2019 (GB) ...................................... 1910587

(51) Int. Cl.
*G01N 23/20* (2018.01)
(52) U.S. Cl.
CPC ....... *G01N 23/20* (2013.01); *G01N 2223/316* (2013.01)
(58) Field of Classification Search
None
See application file for complete search history.

(56) References Cited

U.S. PATENT DOCUMENTS

| | | |
|---|---|---|
| 5,272,746 A | 12/1993 | Isobe et al. |
| 5,588,034 A | 12/1996 | Bowen et al. |
| 6,005,913 A | 12/1999 | Zombo et al. |
| 6,192,103 B1 | 2/2001 | Wormington et al. |
| 7,337,098 B2 | 2/2008 | Yokoyama et al. |
| 7,978,821 B1 | 7/2011 | Glavicic et al. |
| 9,939,393 B2 | 4/2018 | Cernatescu et al. |
| 2003/0009316 A1 | 1/2003 | Yokoyama et al. |
| 2008/0159479 A1 | 7/2008 | Huang et al. |
| 2010/0239068 A1 | 9/2010 | Belassel et al. |
| 2011/0038457 A1 | 2/2011 | Huang et al. |
| 2017/0089845 A1 | 3/2017 | Cernatescu et al. |
| 2018/0231478 A1 | 8/2018 | Cernatescu et al. |
| 2019/0323974 A1 | 10/2019 | Wormington et al. |
| 2020/0225171 A1 | 7/2020 | Griffiths et al. |
| 2020/0386695 A1 * | 12/2020 | Remacha ............... G01N 23/20 |

(Continued)

FOREIGN PATENT DOCUMENTS

| | | |
|---|---|---|
| EP | 3147653 A1 | 3/2017 |
| GB | 2288961 A | 11/1995 |
| KR | 1020090076060 | 7/2009 |

OTHER PUBLICATIONS

Great Britain search report dated Jan. 21, 2020, issued in GB Patent Application No. 1910587.3.

(Continued)

*Primary Examiner* — Hoon K Song (57) ABSTRACT

A method of defining at least one scan parameter for an x-ray scan of a single crystal structure, the method comprising: determining a target orientation of the structure for the scan; and defining different non-zero levels of x-ray exposure for different parts of a scan area based on either or both of the target orientation and characteristics of the structure; and, defining the scan area so that substantially all x-rays of the scan are directed to the structure in the target orientation.

20 Claims, 6 Drawing Sheets

(56) References Cited

U.S. PATENT DOCUMENTS

2021/0025835 A1 1/2021 Griffiths et al.
2021/0048384 A1 2/2021 Fortune

OTHER PUBLICATIONS

European search report dated Feb. 18, 2021, issued in EP patent application No. 20181845.
Miller, M.P., et al., "Understanding local deformation in metallic polycrystals using high energy X-rays and finite elements," Current Opinion in Solid State and Materials Science, vol. 18, pp. 286-299, 2014.
Kirkwood, et al., "Simultaneous X-ray diffraction, crystallography and fluroscence mapping using the Maia Detector," 2018, Acta Materialia, vol. 144, pp. 1-10, doi:10.1016/j.actamat.2017.10.025.
Arnaud, et. al., "Nondestructive testing of single crystal alloy by X-ray diffraction," NDE of Aerospace Materials & Structures 2018 Conference, Jun. 5, 2018.
Laue-HT Single-Crystal Orientation System | Proto XRD. (n.d.). www.protoxrd.com. Retrieved Feb. 14, 2023, from https://www.protoxrd.com/products/laue-single-crystal/laue-ht.
Arnaud "Non-destructive testing of turbine blade integrity by X-Ray diffraction," (n.d.). Retrieved Feb. 14, 2023, from https://dms.mat.minesparis.psl.eu/Donnees/data02/245-Arnaud.pdf.
Eloh, K.S., et al., "The Effect of Crystal Defects on 3D High Resolution Diffraction Peaks: A FFT-Based Method," Materials, vol. 11, No. 9, 14 pp. beginning at p. 1669, 2018.
Jacques, A., "From Modeling of Plasticity in Single-Crystal Superalloys to High-Resolution X-rays Three-Crystal Diffractometer Peaks Simulation," Metallurgical and Materials Transactions A, vol. 47A, pp. 5783-5797, Dec. 2016.
European Search Report dated Jul. 15, 2020, issued in EP Patent Application No. 19216967.0.
Simon Andreas Zabler: "X-ray imaging by partially choerent Synchrotron light: Application to metallic alloys, tooth dentin and natural rock", Oct. 9, 2007 (Oct. 9, 20079); URL:https://depositance.tu-berlin.de/bitstream/11303/2061/1/Dokument_25.pdf, p. 9-15.
Great Britain Search Report dated Jul. 16, 2019, issued in GB Patent Application No. 1900583.4.

* cited by examiner

DEFINING PARAMETERS FOR SCAN OF SINGLE CRYSTAL STRUCTURE

CROSS-REFERENCE TO RELATED APPLICATIONS

This specification is based upon and claims the benefit of priority from UK Patent Application No. GB 1910587.3, filed on 24 Jul. 2019, which is hereby incorporated herein in its entirety.

BACKGROUND

Technical Field

The disclosure relates to a method of defining at least one scan parameter for an x-ray scan of a single crystal structure, and a method of detecting a defect in a single crystal structure.

Description of the Related Art

Components of an aircraft engine such as a gas turbine engine can have a crystallographic structure. For example, a turbine blade can be made of a metal alloy having a crystallographic structure, in particular a single crystal.

The crystallographic structure is analysed to identify anomalies or defects. It is known to use x-ray diffraction to detect subsurface crystallographic structures.

U.S. Pat. No. 9,939,393 and US 2018/0231478 A1 disclose the detection of crystallographic properties in aerospace components. A reference specification of a first beam pattern is obtained. The component is inserted for analysis. The radiation source is activated. A second beam pattern is obtained. The second beam pattern is compared to the first beam pattern. It is determined whether the deviation is greater than a threshold. If the deviation is greater than the threshold, then the component is rejected or repaired, for example. If the deviation is not higher than the threshold, then the component is placed into service.

Known processes are slow and labour intensive. Known inspection processes are subjective due to a reliance on the skill of an operator.

SUMMARY

It is an aim of the present disclosure to provide a method that can help detect an anomaly in a single crystal structure more quickly and/or accurately.

According to a first aspect of the disclosure there is provided a method of defining at least one scan parameter for an x-ray scan of a single crystal structure, the method comprising: determining a target orientation of the structure (50) for the scan; and either or both of defining different non-zero levels of x-ray exposure for different parts of a scan area based on the target orientation and characteristics of the structure; and, defining the scan area so that substantially all x-rays of the scan are directed to the structure in the target orientation.

In an arrangement, the characteristics of the structure comprise the amount of material forming the structure at different parts of the scan area when viewed in the target orientation. In an arrangement, the levels of x-ray exposure are defined to be higher for parts of the scan area where the x-rays would pass through a greater amount of material forming the structure. In an arrangement, the amount of material is determined from either or both of the density of different parts of the structure (50) and the thickness of different parts of the structure when viewed in the target orientation.

In an arrangement, the scan area is defined based on the shape of the structure in the target orientation. In an arrangement, the scan area is defined such that at least one edge of the scan area matches an edge of the structure in the target orientation. In an arrangement, the scan area is defined to match the shape of at least part of the structure.

In an arrangement, a plurality of target orientations are determined for a corresponding plurality of scans, and the steps of defining either or both of different non-zero levels of x-ray exposure and defining the scan area are performed for each scan.

In an arrangement, the method comprises:
measuring the crystallographic orientation of the structure; and
repositioning the structure before each scan so as to control the orientation of the structure relative to the crystallographic orientation.

In an arrangement, the structure is of a metal alloy. In an arrangement, the structure is of an aerospace component. In an arrangement, the structure is of a blade of a turbine for an aircraft engine.

According to a second aspect of the disclosure there is provided a method of detecting a defect in a single crystal structure, the method comprising:
the method as described above;
performing the scan of the structure in the target orientation according to either or both of the defined levels of x-ray exposure and the defined scan area;
measuring the x-ray diffraction signal from the scan;
comparing the x-ray diffraction signal to a simulated pattern for x-ray radiation; and,
detecting an anomaly in the structure based on the comparison.

According to a third aspect of the disclosure there is provided a method of defining at least one scan parameter for an x-ray scan of a single crystal structure, the method comprising:
determining a target orientation of the structure for the scan; and,
defining different non-zero levels of x-ray exposure for different parts of a scan area based on the target orientation and characteristics of the structure.

The method may comprise defining the scan area so that substantially all x-rays of the scan are directed to the structure in the target orientation.

According to a fourth aspect of the disclosure there is provided method of defining at least one scan parameter for an x-ray scan of a single crystal structure, the method comprising:
determining a target orientation of the structure for the scan; and,
defining the scan area so that substantially all x-rays of the scan are directed to the structure in the target orientation.

The method may comprise defining different non-zero levels of x-ray exposure for different parts of a scan area based on the target orientation and characteristics of the structure.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which.

DETAILED DESCRIPTION

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ and 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Figure 1:
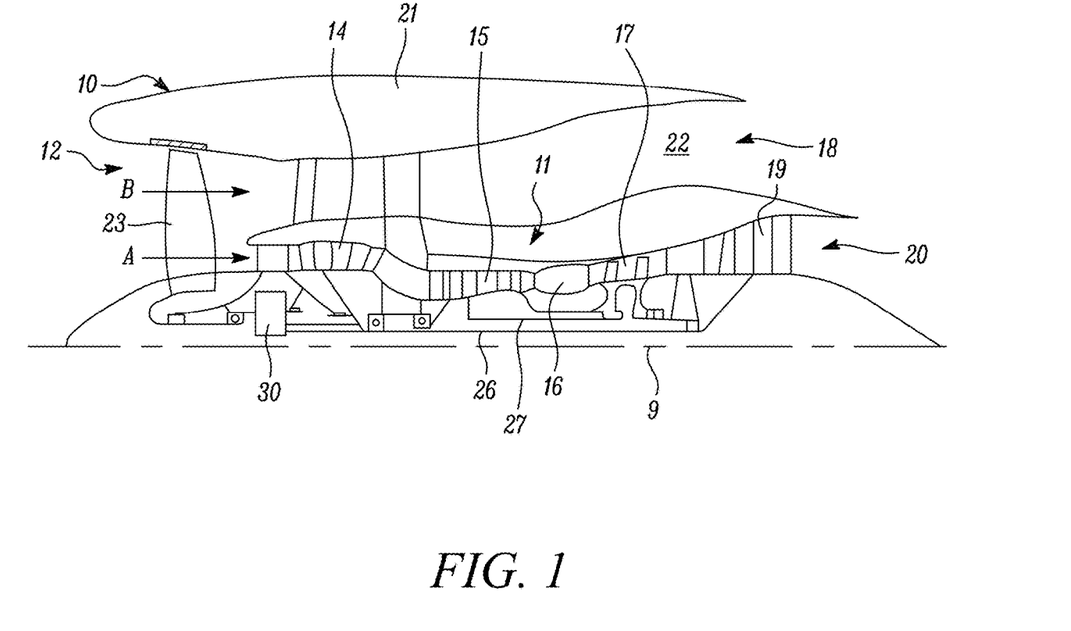
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
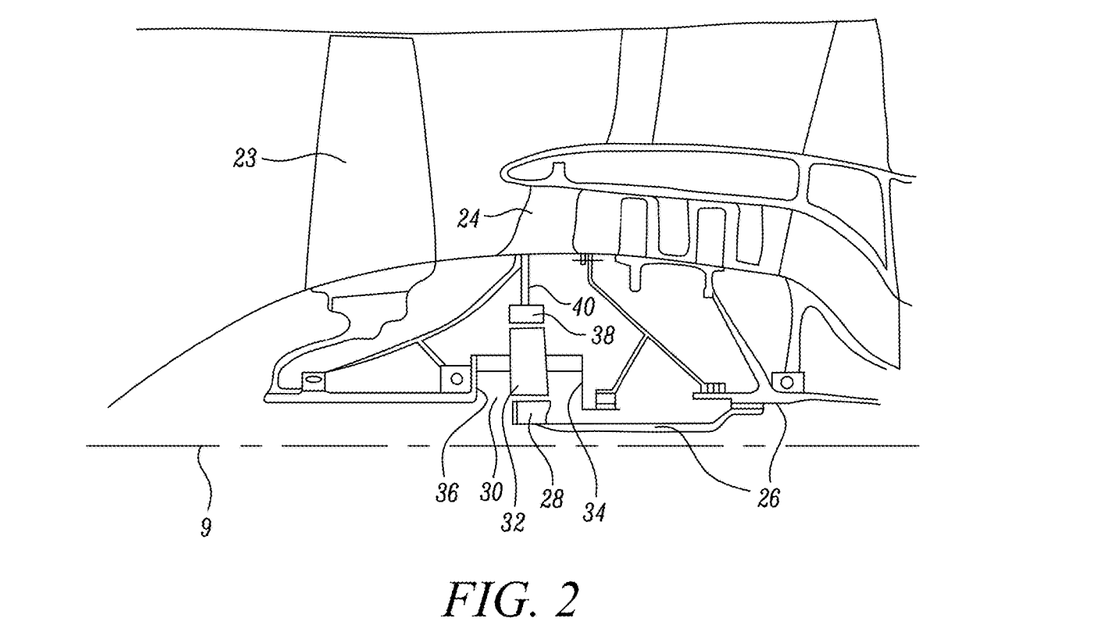
FIG. 2 is a close-up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
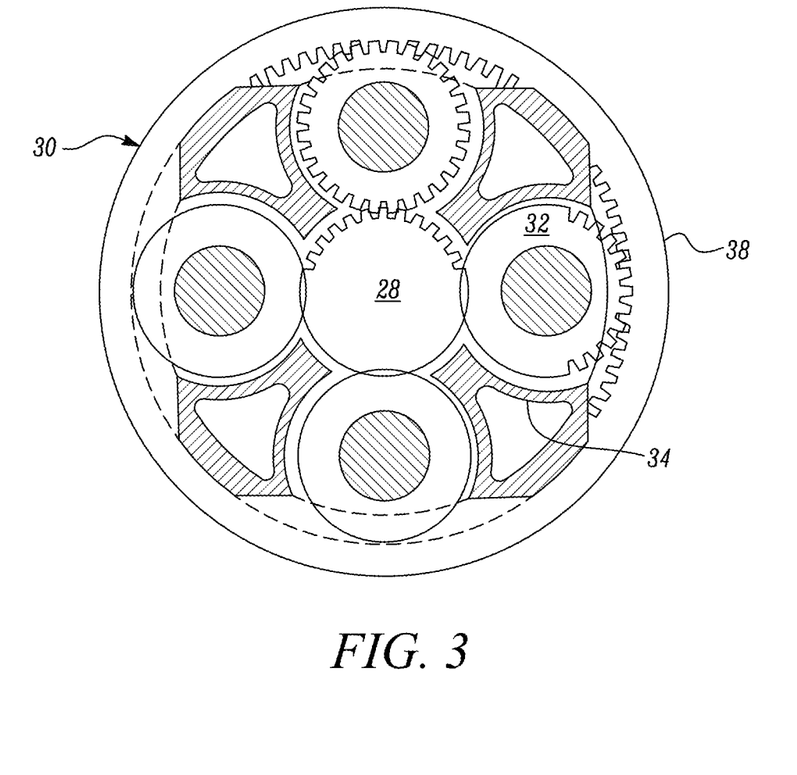
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Components of the gas turbine engine 10 can have a single crystal structure. For example, a component may be made from a metal alloy, such as a nickel alloy (e.g. a nickel superalloy), an aluminium alloy or a titanium alloy. The metal alloy may have a single crystal structure. Embodiments of the present disclosure will be described below in the context of a blade 50 of the high-pressure turbine 17. However, embodiments of the present disclosure are not limited to being used in the context of turbine blades, but may be applied to other components, particularly other aerospace components that may have a crystallographic structure. An example of another such component is a nozzle guide vane.

A turbine blade 50 is made to have a crystallographic structure. The turbine blade 50 is tested to determine if it can be put into service, or if it needs to be repaired or discarded, for example. In particular, if there are too many or too serious anomalies in the crystallographic structure, then it may need to be repaired or discarded. If the crystallographic structure has defects below a threshold, then it may be put into service.

Figure 4:
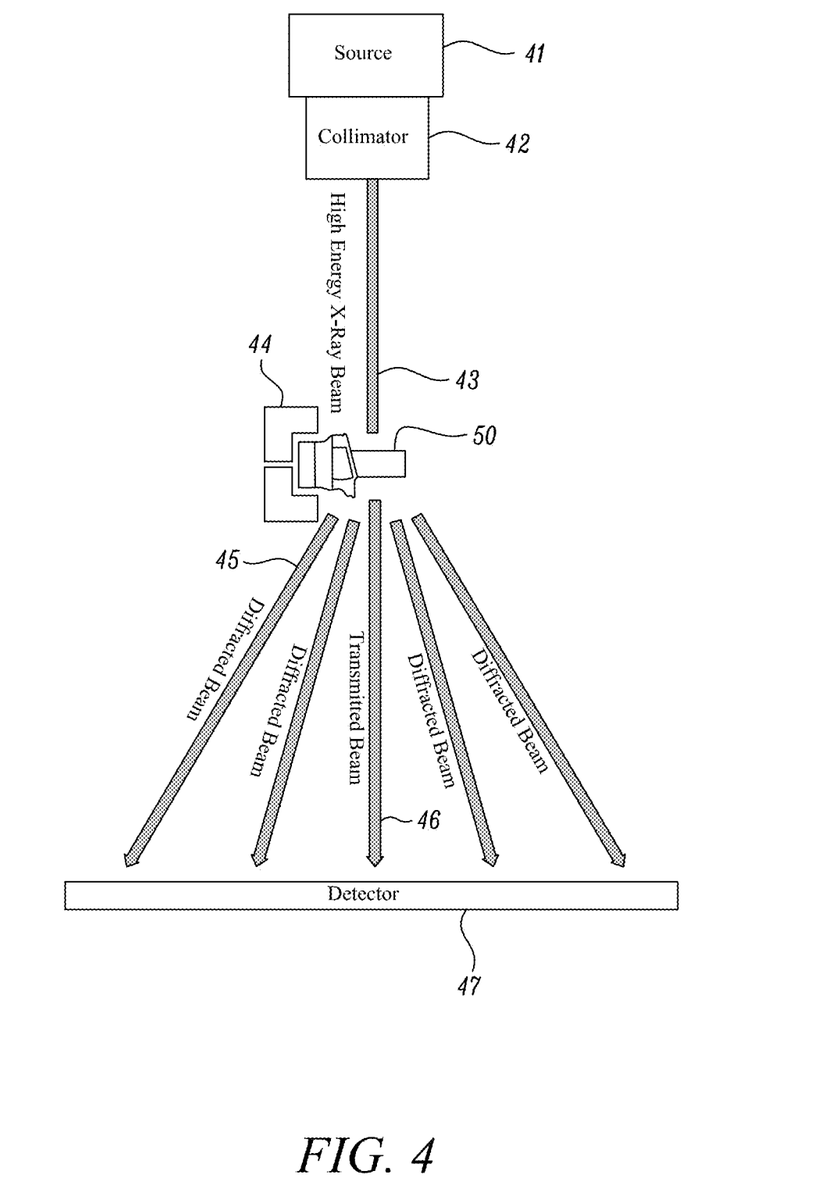
FIG. 4 schematically depicts the configuration of a system for performing a method of detecting an anomaly in a crystallographic structure.

FIG. 4 schematically shows the configuration of a system for testing the turbine blade 50. In particular, the system shown in FIG. 4 can be used in a method of detecting an anomaly in a crystallographic structure (e.g. the crystallographic structure of the turbine blade 50). Embodiments of the present disclosure are not limited to the system configured as shown in FIG. 4.

As shown in FIG. 4, in an arrangement the system comprises a source 41. The source 41 is a radiation source for generating x-ray radiation. The x-ray radiation may have a wavelength ranging from 0.01 to 10 nm. The type of source 41 is not particularly limited. Merely as an example, the source 41 may be a 300 kV, 15 mA constant potential x-ray tube with a 4 mm focal spot.

As shown in FIG. 4, in an arrangement the system comprises a collimator 42. The collimator 42 may be fixed relative to the source 41. The collimator 42 is positioned downstream of the source 41. The collimator 42 is configured to collimate the x-ray radiation output by the source 41. The type of collimator is not particularly limited. Merely as an example, the collimator 42 may be a lead collimator with a 0.75 mm diameter aperture. In an arrangement, the collimator 42 is fixed in place using three adjustor bolts to enable accurate alignment onto the focal spot of the source 41 and then locked into position. The collimator 42 allows the direction of the x-ray radiation to be controlled accurately.

In combination, the source 41 and the collimator 42 are configured to generate a high energy x-ray beam 43 with a well-controlled direction. As shown in FIG. 4, the high energy x-ray beam 43 is directed to the turbine blade 50. The x-ray beam 43 is incident on the turbine blade 50.

As shown in FIG. 4, in an arrangement the system comprises a fixture 44. The fixture 44 is configured to hold the turbine blade 50 in position. In an arrangement, the turbine blade (or other specimen material) is clamped into the fixture 44.

Although not shown in FIG. 4, in an arrangement the fixture 44 is positioned on a rotatable table. The rotatable table is configured to rotate around multiple axes in order to allow accurate alignment of the turbine blade 50. The position and orientation of the turbine blade 50 can be controlled accurately relative to the direction to the x-ray beam 43.

As shown in FIG. 4, there is a transmitted beam 46 and multiple diffracted beams 45 downstream of the turbine blade 50. The transmitted beam 46 is x-ray radiation that has transmitted through the region in which the turbine blade 50 is positioned. The transmitted beam 46 has substantially the same direction as the high energy x-ray beam 43 generated by the source 41 and collimator 42. The diffracted beams 45 travel from the turbine blade 50 at different angles relative to the high energy x-ray beam 43.

As shown in FIG. 4, in an arrangement the system comprises a detector 47. The detector 47 is configured to detect the diffracted beams 45. The detector 47 is configured to capture the diffraction images. The detector 47 is configured to detect the pattern of diffracted beams 45, i.e. the x-ray diffraction signal. In an arrangement, the system comprises a beam stop (not shown in FIG. 4) on the detector 47. The beam stop is configured to attenuate the transmitted beam that is incident on the detector 47.

The type of detector is not particularly limited. Merely as an example, in an arrangement the detector 47 is a flat panel with dimensions of 200 mm×200 mm. In an arrangement, the detector 47 is fixed in position relative to the source 41 and/or the collimator 42. For example, the source 41, the collimator 42 and the detector 47 may be mounted onto the same frame. The frame may be, for example, an aluminium slide rail. By providing a slide rail, the detector 47 may be moved closer to or further away from the source 41 and the collimator 42.

In an arrangement, the system comprises software for controlling the movement of the turbine blade 50 and to record diffraction images during the scanning process.

In an arrangement, the system comprises analysis software for taking the images generated from the scan. The analysis software is configured to process and interpret these images to allow a sentencing decision to be made. The sentencing decision is a decision about how the turbine blade 50 should be processed, e.g. whether it can be put into service or repaired or discarded.

Figure 5:
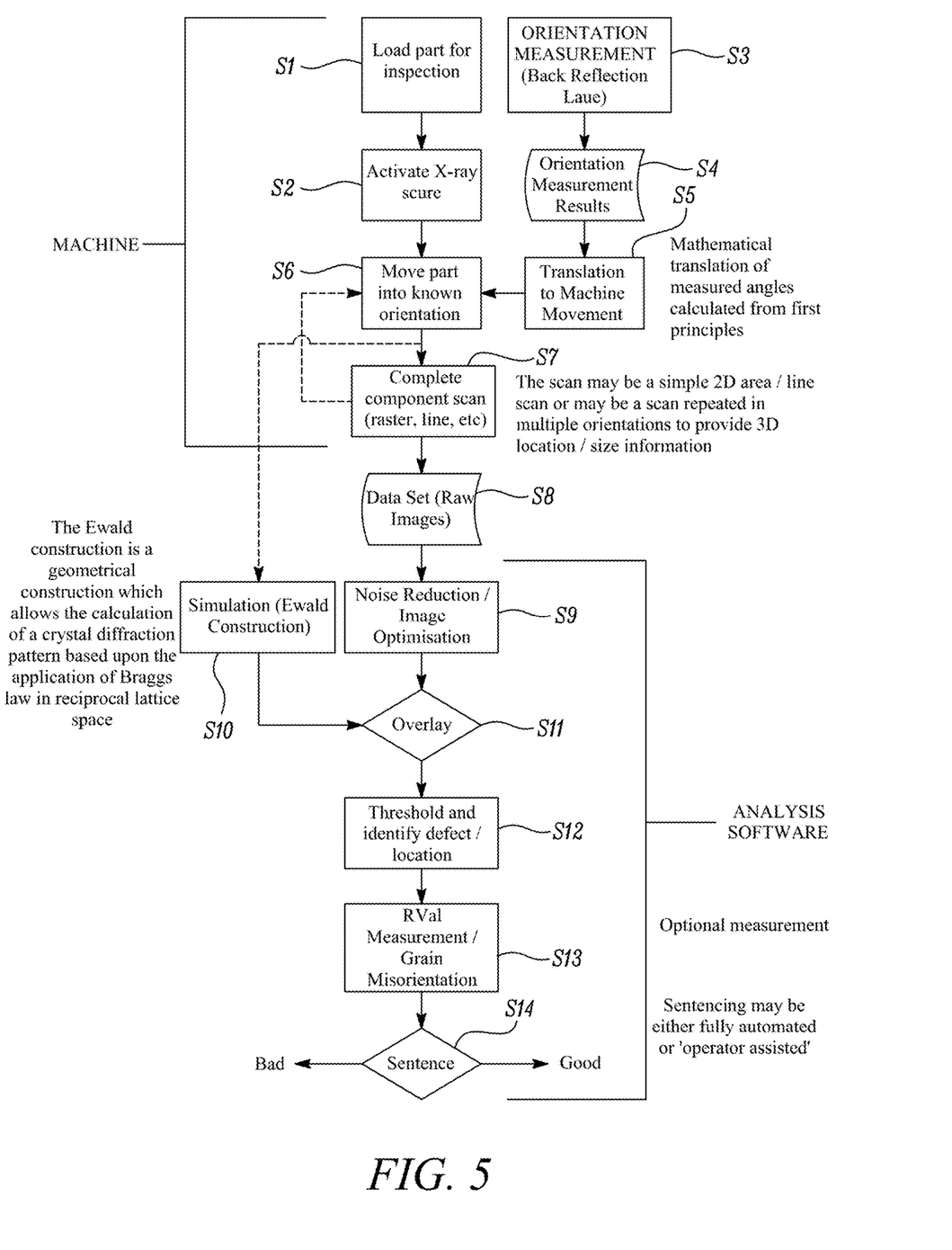
FIG. 5 is a flowchart showing steps in a method of detecting an anomaly in a crystallographic structure.

FIG. 5 is a flowchart showing steps in a method of detecting an anomaly in the crystallographic structure. Some of the steps of the method may be performed using the system shown in FIG. 4.

Figure 6:
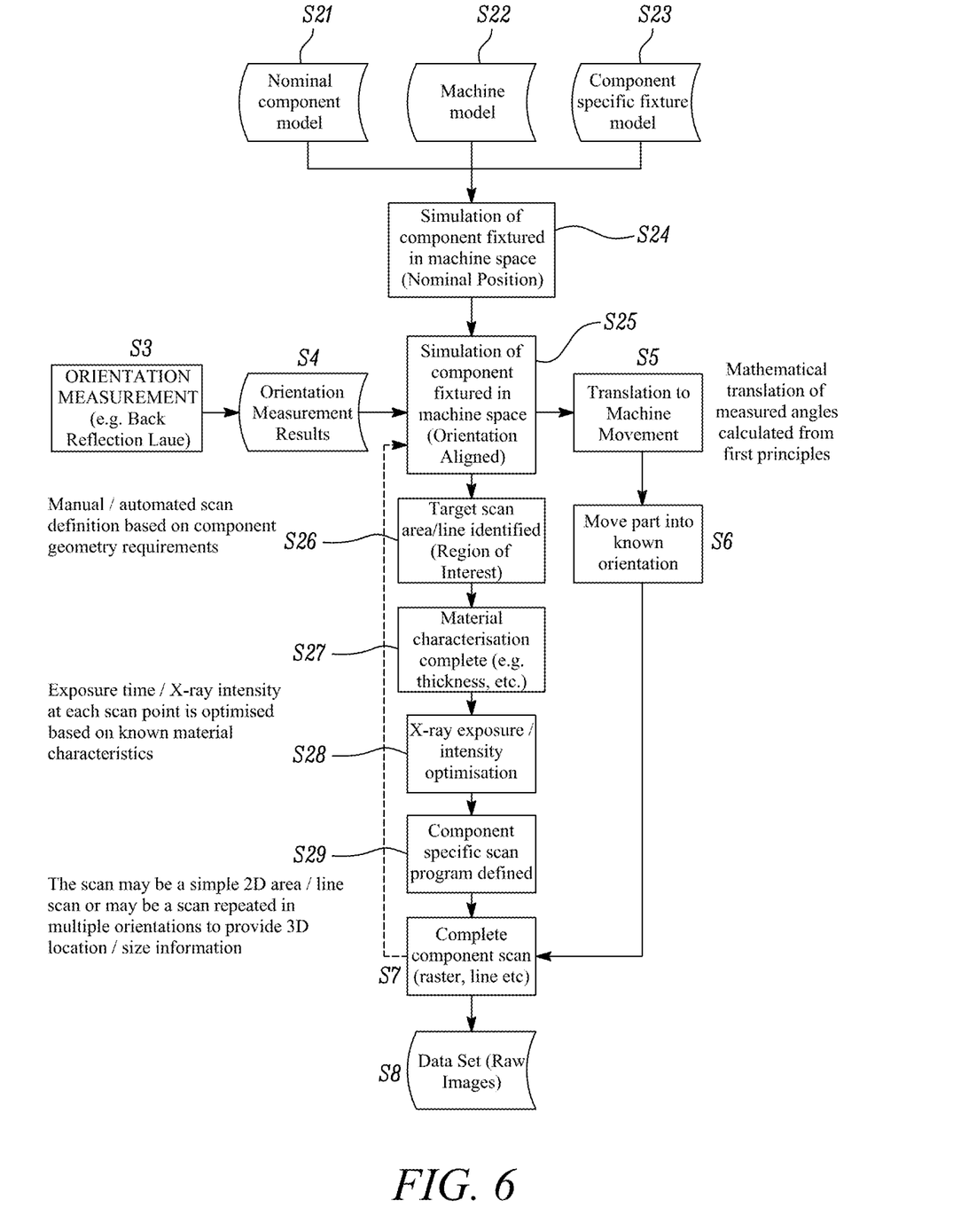
FIG. 6 is a flow chart showing steps in a method of defining scan parameters and performing a scan of a single crystal structure.

As shown in FIGS. 5 and 6, in an arrangement the method comprises positioning S6 the structure (e.g. the turbine blade 50) such that its crystallographic orientation is known. The blade 50 is orientated to a known orientation as interpreted by an operator, or through previous measurement of the crystal orientation, e.g. via back reflection or spatially resolved acoustic spectroscopy (the method of measurement is not particularly limited). In particular, the orientation of the turbine blade 50 may be controlled such that its crystal lattice orientation relative to the x-ray beam 43 from the source 41 and collimator 42 is known. Hence, the part (e.g. the turbine blade 50) is moved into a known orientation. The turbine blade 50 may be moved using the fixture 44 controlled by software.

As shown in FIGS. 5 and 6, in an arrangement the method comprises illuminating S2, S7 the structure with x-ray radiation in a known direction relative to the crystallographic orientation, and detecting S7 a pattern of the diffracted x-ray radiation transmitted through the turbine blade 50. The turbine blade 50 is illuminated with the high energy x-ray beam 43 from a direction that is controlled relative to the crystallographic orientation of the turbine blade 50. A pattern of the diffracted transmitted beams 45 is detected by the detector 47. This produces an x-ray diffraction signal.

As shown in FIG. 5, in an arrangement the method comprises comparing S11 the detected pattern to a simulated pattern for x-ray radiation illuminating the turbine blade 50 in the known direction (i.e. the known direction relative to the crystallographic orientation). The comparison is for determining any differences between the actual detected pattern and the simulated pattern across the area of a turbine blade. In an arrangement, the method comprises detecting an anomaly in the crystallographic structure based on the comparison. Anomalies or defects show up as differences between the detected diffraction pattern and the simulation. The simulation is the diffraction pattern that would be expected if the crystallographic structure of the turbine blade 50 had no defects or anomalies.

Optionally, the incident x-ray beam 43 is aligned to a known crystallographic axis of the turbine blade 50. This allows accurate pattern simulations to be generated for comparison. This also makes it easier to select optimal imaging conditions.

Images are captured over a specific region of interest. The simulated pattern is matched (e.g. automatically) and overlaid on each recorded diffraction pattern. In an arrangement, an initial pattern of the primary crystal is used to match the simulated pattern which is then matched across a scan and used for the comparison. This enables identification of diffraction spots associated with the primary grain of the crystallographic structure. Accordingly, no reference beam for producing a reference image is required. The use of simulations (rather than a reference beam) further allows the method to be applied to complex part geometries. The use of simulations increases the probability of detection of unacceptable grain defects when compared to the use of a reference beam pattern. In the known systems, a reference beam pattern (rather than a simulation) is needed because the orientation of the crystallographic structure of the turbine blade 50 relative to the high energy x-ray beam 43 is not controlled.

In an arrangement, the positioning step S6 comprises controlling a machine (e.g. the fixture 44) to control the orientation of the structure (e.g. the turbine blade 50) based on a measurement of the crystallographic orientation of the structure. The software that controls the fixture 44 may receive as an input data indicating the measured crystallographic orientation of the turbine blade 50. In particular, as shown in FIG. 5, in an arrangement the method comprises the step of translating S5 orientation measurement results to the machine movement. In an arrangement, the mathematical translation of measured angles is calculated from first principles.

FIG. 6 is a flow chart showing steps in a method of defining at least one scan parameter for the x-ray scan of the single crystal structure (e.g. the turbine blade 50). The flow chart shown in FIG. 6 is compatible with the flow chart shown in FIG. 5.

In an arrangement, the method comprises determining a target orientation of the turbine blade 50 for the scan. The target orientation of the turbine blade 50 may relate to the crystallographic orientation of the turbine blade 50. The target orientation may be selected such that the scan (i.e. illumination) of the turbine blade 50 is performed with the turbine blade 50 in a particular orientation with respect to its crystallographic orientation.

The target orientation may be determined before the positioning step S6. The positioning step S6 can then be performed so as to position the turbine blade 50 in the target orientation, ready for the scan.

As shown in FIG. 6, in an arrangement the method comprises a scan area defining step S26. In the scan area defining step S26, the scan area (i.e. the region of interest) is defined. The scan is set to be performed in accordance with the defined scan area.

Figure 7:
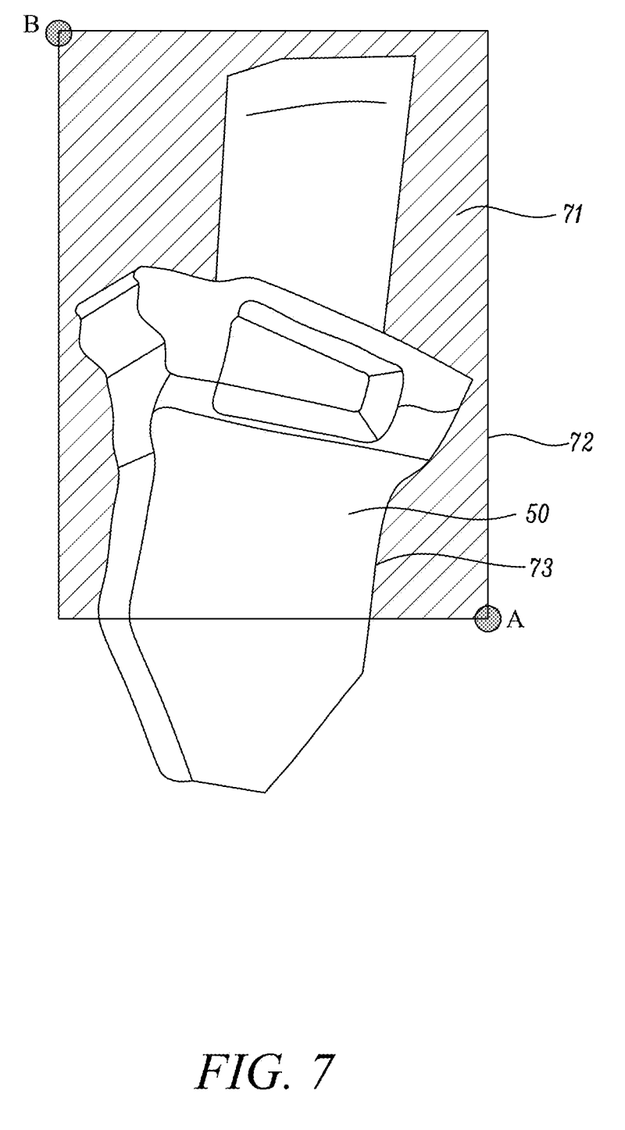
FIG. 7 detects a scan area defined for a scan of a single crystal structure.

FIG. 7 depicts a scan area 71 for the turbine blade 50. FIG. 7 shows the turbine blade 50 in the target orientation as viewed from the source of the x-ray radiation. The scan area 71 defines a region which is to be illuminated by x-rays during the scan.

In an arrangement, the scan area 71 is defined based on the shape of the single crystal structure (e.g. turbine blade 50) in the target orientation. This is not shown in FIG. 7 in which the scan area 71 is rectangular even though the turbine blade 50 is not rectangular.

In an arrangement, the scan area 71 is defined such that at least one edge 72 of the scan area 71 match an edge 73 of the single crystal structure (e.g., turbine blade 50) in the target orientation. For example, it may be desirable to scan the whole aerofoil section in which case it may be desirable for scan areas to work from edges of the aerofoil section. It is noted that FIG. 7 shows a scan area 71 defined by horizontal and vertical edges 72. However, alternatively, at least one edge 72 of the scan area 71 matches (e.g. follows or corresponds to) one of more edges 73 of the turbine blade 50. For example, the edge labelled with the reference number 73 in FIG. 7 is at an oblique angle with respect to the vertical. One edge 72 of the scan area may be defined such that it overlies the edge 73 of the turbine blade 50. The edges 72 of the scan area 71 may substantially overlie the edges 73 of the turbine blade 50 when viewed in the target orientation. This avoids x-ray radiation being directed such that it misses the turbine blade 50 completely. In an arrangement, the scan area 71 is defined to match the shape of at least parts of the single crystal structure (e.g. turbine blade 50).

Optionally, the region of interest for the scan may be defined specifically around some internal geometry that is of specific interest, e.g. in a region prone to crystallographic defects or know to be highly stress in operation. The region may be, for example, a small section of the aerofoil in a region away from the edge of the component. In such a situation, the scan area 71 may not have an edge matching an edge of the single crystal structure.

As described above, the scan area 71 is defined based on the geometry requirements of the turbine blade 50. This decreases cycle time. The size of the scan area 71 can be reduced, without removing any of the results that are useful for detecting an anomaly. Instead, only redundant use of x-rays is reduced.

Of course, it may be that the scan area 71 is defined such that a small amount of x-ray radiation misses the turbine blade 50. This may particularly be the case when it is important that the edges 73 of the turbine blade 50 are included in the scan area 71. For example, a narrow border around the edges 73 of the turbine of the turbine blade 50 may be included in the scan area 71. In an arrangement, at least 90%, optionally, optionally at least 98% and optionally at least 99% of x-ray radiation emitted for the scan is directed to the turbine blade 50.

The scan area 71 can be defined manually or automatically.

Alternatively, as shown in FIG. 7, optionally the scan area 71 is defined by two-points A and B. These two points A and B define the corners of a rectangle which defines the scan area 71. The points A and B may be selected so that a particular portion of the turbine blade 50 is included in the scan area 71. The scan area 71 may be defined manually or automatically in this way.

As shown in FIG. 6, in an arrangement the method comprises an exposure level defining step S28. The exposure level defining step S28 comprises defining different non-zero levels of x-ray exposure for different parts for the scan areas 71 based on the target orientation and characteristics of the single crystal structure (e.g. turbine blade 50). The exposure level may be related to the exposure time, i.e. the length of time for which each part of the scan area is illuminated by x-ray radiation. Hence, there may be a variable exposure time, i.e. relating the targeted scan area 71 to a variable exposure time to maximise measured diffraction pattern intensity. The scan of the structure in the target orientation may be performed with a variable exposure time dependent on component thickness. Additionally or alternatively the exposure level may be related to the power or intensity of the x-rays. X-rays of different power or intensity may be provided for different parts of the scan area 71.

At each part in the scan (i.e. at each part of the scan area 71), the amount of material that the x-ray beam must past through can vary, depending on the geometry of the turbine blade 50. By defining different non-zero levels of x-ray exposure for different parts of the scan area 71 the overall exposure can be reduced without adversely affecting the results of the scan. This can reduce the time taken for the scan.

In particular, an alternative is to apply the maximum exposure required to all parts of the scan area 71 so as to ensure that the possibility of detecting anomalies or defects in the single crystal structure is maintained. However, this can waste exposure time for parts of the scan area 71 where there is a relatively small amount of material through which the x-ray beam must pass.

By defining different non-zero levels of x-ray exposure for different parts of the scan area 71, larger amounts of x-ray exposure can be provided where it is needed, while smaller amounts of x-ray exposure can be used where only a smaller amount is needed. In this way, the x-ray exposure of the scan can be optimised. The exposure time at each scan point may be optimised based on known material characteristics.

As shown in FIG. 6, in an arrangement, the method comprises a material characterization step S27. In the material characterisation step S27, the material of the turbine blade 50 is characterised.

In an arrangement, the characteristics comprise the amount of material forming the structure at different parts of the scan area when viewed in the target orientation. In an arrangement, the levels of x-ray exposure are defined to be higher for parts of the scan area 71 where the x-rays would pass through a greater amount of material forming the single crystal structure. The x-ray radiation is used to the extent that it is needed.

The characteristics of the turbine blade 50 (or other single crystal structure) may comprise the density of the material and/or the thickness of the material. These characteristics are related to the amount of material through which the x-ray beams must pass. For example, the amount of material may be determined from the density of the structure and/or the thickness of different parts of the structure when viewed in the target orientation.

may be that these characteristics of the turbine blade 50 are already known for the target orientation. Alternatively, the characteristics may be calculated for the target orientation based on the known geometry and materials used for the turbine blade 50. As a further alternative, the characteristics may be measured.

The exposure level defining step S28 may be performed based on the material characterisation step S27. As shown in FIG. 6, the exposure level defining step S28 may be performed after the material characterisation step S27.

FIG. 6 shows that the exposure level defining step S28 is performed after the scan area defining step S26. However, this is not necessarily the case. The scan area defining step S26 could be performed after the exposure level defining step S28.

As a further alternative, one of the scan area defining step S28 and the exposure level defining step S28 may be omitted. If the exposure level defining step S28 is omitted, then the material characterization step S27 may be redundant and may not be performed.

As shown in FIG. 6, in an arrangement the method comprises a scan program defining step S29. In the scan program defining step S29, the component specific scan program is defined. The scan program identifies scan parameters for the scan of the single crystal structure (e.g. turbine blade 50). The scan parameters may comprise the definition of the scan area 71 and the defined exposure levels of different parts of the scan area 71.

The scan is then performed in accordance with the scan program. The scan is performed in accordance with the defined scan area 71 and/or the defined exposure levels. This allows the scan to be performed in a smaller amount of time, without adversely affecting the results used to detect anomalies or defects in the turbine blade 50.

Scan parameters can be defined and optimised on a part-by-part basis. In an arrangement, exposure times can be set based on known material conditions at each position within the defined scan area 71. In an arrangement, the scan area 71 can be optimised based on component geometry requirements at known part/crystallographic orientations relative to the x-rays.

Optionally, the scan area 71 is defined so as to take into account regions of the structure which are known to be most highly stressed during operation. For example, the scan area 71 may be defined so as to include a region of the turbine blade 50 which is known to be particularly highly stressed during its use.

In an arrangement, the scan area 71 is defined so that substantially all x-rays of the scan are directed to the single crystal structure (e.g. turbine blade 50) in the target orientation. This is not shown in FIG. 7. FIG. 7 shows a scan area 71, a significant part of which is outside of the turbine blade 50. This means that during the scan some of the x-rays are not targeted at the turbine blade 50. By defining the scan area 71 so that substantially all x-rays of the scan are directed to the turbine base 50 in the target orientation, the possibility of redundant x-rays is reduced. By reducing the x-rays that miss the turbine blade 50, the time taken to complete the scan can be reduced.

As shown in FIGS. 5 and 6, in an arrangement the method comprises measuring S3 the crystallographic orientation of the turbine blade 50. However, it is not essential for the method to comprise the step of measuring the crystallographic orientation. For example, the orientation may have previously been measured, in which case the data from the previous measurement may be used (rather than performing a further orientation measurement).

In an arrangement, the crystallographic orientation of the turbine blade 50 is measured using Laue back reflection. Laue back reflection is a production technique used for the assessment of primary grain orientation and grain disorientation in, for example, single crystal turbine blades. Laue back reflection is a multi-stage inspection process.

In an arrangement, the Laue back reflection technique comprises loading the turbine blade 50 into the fixture 44 (or other machine), capturing an image of the turbine blade 50, overlaying a simulated pattern, manually (or automatically) aligning the simulation to the captured image, and calculating the results (which may be done automatically).

The Laue back reflection or alternative orientation measurement technique provides orientation measurement results S4. Embodiments of the present disclosure are not limited to the use of Laue back reflection to determine the orientation. For example, spatially resolved acoustic spectroscopy (SRAS) may be used. The orientation measurement results S4 can then be used to control the change in orientation of the turbine blade 50 by the fixture 44.

As shown in FIG. 6, in an arrangement the method comprises steps S21 to S25 for simulating the single crystal structure (e.g. turbine blade 50) loaded into the fixture 44. In step S21 a nominal component model is provided. The nominal component model is the known component geometry. In particular, the shape and weight distribution of the turbine blade 50 may be part of the nominal component model. The nominal component model may be stored in a memory that is accessible when the simulation is to be performed.

In step S22, a machine model is provided. The machine model includes information about the system including the fixture 44. In step S23 a component specific fixture model is provided. The component specific fixture model includes information about the type of fixture 44 used to hold the single crystal structure in place. For example, a different type of fixture 44 may be used for different single crystal structures.

In step S24, a simulation of the component fixture in the machine space is performed. This simulation is based on the nominal component model, the machine model and the component specific fixture model. This is a simulation of the single crystal structure (e.g. turbine blade 50) held by the fixture 44 in a nominal position (i.e. no particular orientation with respect the crystallographic).

In step S25, an orientation aligned simulation of the component fixture in machine space is performed. This is a simulation of the turbine blade 50 loaded to the fixture 44 in a particular known orientation with respect to the crystallographic orientation. This simulation can be used for the scan area defining step S26 and/or the exposure level defining step S28.

Simulation of the component fixture in machine space allows for machine interaction assessments such as crash detection. In an arrangement, adaptive programming is used. This allows an improvement in process performance. Embodiments of the present disclosure allow single crystal structures having more complex geometries to be inspected within a reasonable amount of time.

As shown in FIG. 5, in an arrangement the method comprise loading 51 the turbine blade 50 for inspection. The turbine blade 50 can be loaded into the fixture 44. In an arrangement, the method comprises activating S2 the x-ray source 41. By activating the source 41, the high energy x-ray beam 43 is directed towards the turbine blade 50. Of course, these steps may not be necessary if the turbine blade 50 has already been loaded and/or the x-ray source 41 has already been activated.

By performing the steps of illuminating the turbine blade and detecting the pattern of diffracted x-ray radiation, the component scan is completed. In an arrangement, the illuminating step and the detecting step are performed for a plurality of different directions (of the high energy x-ray beam 43) relative to the crystallographic orientation. As indicated in FIG. 5, the scan may be a scan repeated in multiple orientations. By performing the scan in multiple orientations, it is possible to provide 3D location information and/or 3D size information of the crystallographic structure (and any anomalies or defects in the crystallographic structure).

However, it is not essential for the scan to be repeated in multiple orientations. For example, in an arrangement the scan may be a 2D area/line scan. In this case, only one orientation may be needed.

As shown in FIGS. 5 and 6, in an arrangement the turbine blade 50 is repositioned before each illuminating step so as to control the direction relative to the crystallographic orientation. Between each repeated scan, the part is moved into a new known orientation. Accordingly, the data required to provide the 3D location/size information can be obtained by controlling the orientation of the turbine blade 50 relative to the x-ray beam 43 for the different scans.

As indicated in FIG. 5, steps S1 to S7 may be performed in the machine (i.e. the set up shown in FIG. 4). Subsequent processing steps may be performed externally, i.e. away from the machine. Alternatively, steps S1 to S7 and the subsequent processing steps are performed in one machine. For example, a second detector may be arranged to capture reflected beams to allow the orientation measurement S3 and provide the orientation measurements results S4.

The results of the scans performed on the turbine blade 50 is a data set S8 of raw images, i.e. diffraction patterns corresponding to x-ray diffraction signals.

As shown in FIG. 5, in an arrangement, the method comprises reducing S9 image noise in the detected pattern. Image noise reduction can be achieved by the application of one or more noise filters. Such noise filters may be based on a global noise estimate, for example. In an arrangement, Median filtering and/or Gaussian filtering are used to reduce the image noise.

As shown in FIG. 5, in an arrangement the method comprises S9 image optimisation on the detected pattern. Image optimisation may be achieved by the application of erosion and dilation techniques. Image optimisation may be achieved with the use of Laplacian filtering and/or structuring elements. Such image optimisation can help to enhance diffraction spot features before adaptive thresholding of the image. The noise reduction and/or image optimisation are optional.

As shown in FIG. 5, in an arrangement the method comprises generating S10 the simulated pattern based on the known direction relative to the crystallographic orientation. Knowledge of the crystallographic orientation allows the simulation to be generated accurately.

In an arrangement, the simulated pattern is generated according to an Ewald construction. Alternative methods may be used to generate the simulated pattern. The Ewald construction is a geometrical construction which allows the calculation of a crystal diffraction pattern. The Ewald construction is based upon the application of Bragg's law in reciprocal lattice space. Of course, other simulation techniques may be used apart from the Ewald construction. It may not be necessary to perform the step of generating the simulation if an appropriate simulation has previously been generated. In this case, a stored simulation may be used, for example.

As shown in FIG. 5, in an arrangement the simulated pattern is overlaid S11 relative to the detected pattern. This allows the identification of anomalies or defects in the crystallographic structure of the turbine blade 50. The images captured are directly compared with simulated patterns. This helps to ensure that variations in visible diffraction spots (e.g. due to material thickness or other material properties affecting diffraction contrast) can be accounted for. This increases the accuracy in identifying defects.

In an arrangement, the images are thresholded using adaptive thresholding behaviour being numbered through a connected components analysis. The detected spot positions are then checked against the simulated pattern spot locations to detect if anomalous diffraction spots are present and hence detect crystallographic defects. In particular, the diffraction images undergo a thresholding procedure to detect the spots in the image. These spots are then numbered using a connected components algorithm, with the number consistent in each image across a scan (the spot locations are then compared with expected spot locations from the simulated pattern where a threshold is used to determine if they are expected or not).

In an arrangement, one or more neural networks are configured to perform segmentation. In particular, the one or more neural networks may be configured to analyse an image and output a threshold mask in which detected spot positions can be compared with the simulated pattern spot positions.

In an arrangement, the method comprises threshold and identify defect/location S12. It may be determined whether the level of defects in the crystallographic structure is above a threshold or not. The location of defects within the crystallographic structure of the turbine blade 50 may be identified, so as to help determine the seriousness of the defect.

In an arrangement, the method comprises the measurement of grain misorientation (RVal) of the crystallographic structure S13. This helps to determine how the turbine blade 50 should be processed. This is an optional measurement. This measurement can be performed using analysis software.

As shown in FIG. 5, in an arrangement, the method comprises sentencing S14 the turbine blade 50. For example, it can be determined that the turbine blade 50 is good, in which case the turbine blade 50 may be put into service. The result of the sentencing S14 may be that the turbine blade is bad. This determination may lead to the turbine blade 50 being sent for repair, or rejected (i.e. discarded). In arrangement, the sentencing S14 is fully automated. Alternatively, the sentencing S14 may be assisted by an operator.

As mentioned above, diffraction spots are identified. The diffraction spots may correspond to defects or anomalies in the crystallographic structure of the turbine blade 50. In an arrangement, the method comprises labelling the diffraction spots that are detected. By labelling the diffraction spots, it is possible to track the spots over the recorded diffraction patterns across the scanned region of interest. This helps to identify diffraction spots that are not associated with the primary crystal such that anomalies in the crystal structure can be identified.

In an arrangement, the method comprises compensating for pattern distortion effects. Such pattern distortion effects may include elongation, twisting, and beam splitting. In an arrangement, the compensation for pattern distortion effects is made during the spot labelling procedure. This helps allow labelled spots to be clearly tracked across the defined scan area.

The technique can be applied reliably to complex geometries. This is not so easy for techniques that use a reference beam rather than a simulation. The fact that the turbine blade 50 is positioned such that its crystallographic orientation is known relative to the x-ray beam 43 makes it easier for simulations to be generated accurately.

The results can be mapped in 2D or 3D space. This helps defects or anomalies to be located and assessed more accurately. This allows the measurement of secondary grain misorientation. It is not necessary to prepare the surfaces prior to inspection.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of defining at least one scan parameter for an x-ray scan of a single crystal structure, the method comprising:
   determining a target orientation of the structure for the scan;
   measuring the crystallographic orientation of the structure;
   repositioning the structure before each scan so as to control the orientation of the structure relative to the crystallographic orientation; and either or both of:
      defining different non-zero levels of x-ray exposure for different parts of a scan area based on the target orientation and characteristics of the structure; and
      defining the scan area so that substantially all x-rays of the scan are directed to the structure in the target orientation.

2. The method as claimed in claim 1, wherein the characteristics of the structure comprise the amount of material forming the structure at different parts of the scan area when viewed in the target orientation.

3. The method as claimed in claim 2, wherein the levels of x-ray exposure are defined to be higher for parts of the scan area where the x-rays would pass through a greater amount of material forming the structure.

4. The method as claimed in claim 2, wherein the amount of material is determined from either or both of the density of different parts of the structure and the thickness of different parts of the structure when viewed in the target orientation.

5. The method as claimed in claim 1, wherein the scan area is defined based on the shape of the structure in the target orientation.

6. The method as claimed in claim 5, wherein the scan area is defined such that at least one edge of the scan area matches an edge of the structure in the target orientation.

7. The method as claimed in claim 5, wherein the scan area is defined to match the shape of at least part of the structure.

8. The method as claimed in claim 1, wherein a plurality of target orientations are determined for a corresponding plurality of scans, and the steps of either or both of defining different non-zero levels of x-ray exposure and defining the scan area are performed for each scan.

9. The method as claimed in claim 1, wherein the structure is of a metal alloy.

10. The method as claimed in claim 1, wherein the structure is of an aerospace component.

11. The method as claimed in claim 1, wherein the structure is of a blade of a turbine for an aircraft engine.

12. A method of detecting a defect in a single crystal structure, the method comprising:
   determining a target orientation of the structure for a scan;
   measuring the crystallographic orientation of the structure;
   repositioning the structure before the scan so as to control the orientation of the structure relative to the crystallographic orientation;
   defining either or both of:
      different non-zero levels of x-ray exposure for different parts of a scan area based on the target orientation and characteristics of the structure;
      the scan area so that substantially all x-rays of the scan are directed to the structure in the target orientation;
   performing the scan of the structure in the target orientation according to either or both of the defined levels of x-ray exposure and the defined scan area;
   measuring the x-ray diffraction signal from the scan;
   comparing the x-ray diffraction signal to a simulated pattern for x-ray radiation; and
   detecting an anomaly in the structure based on the comparison.

13. The method as claimed in claim 12, wherein the characteristics of the structure comprise the amount of material forming the structure at different parts of the scan area when viewed in the target orientation.

14. The method as claimed in claim 13, wherein the levels of x-ray exposure are defined to be higher for parts of the scan area where the x-rays would pass through a greater amount of material forming the structure.

15. The method as claimed in claim 13, wherein the amount of material is determined from either or both of the density of different parts of the structure and the thickness of different parts of the structure when viewed in the target orientation.

16. The method as claimed in claim 12, wherein the scan area is defined based on the shape of the structure in the target orientation.

17. The method as claimed in claim 16, wherein the scan area is defined such that at least one edge of the scan area matches an edge of the structure in the target orientation.

18. The method as claimed in claim 16, wherein the scan area is defined to match the shape of at least part of the structure.

19. The method as claimed in claim 12, wherein a plurality of target orientations are determined for a corresponding plurality of scans, and the steps of either or both of defining different non-zero levels of x-ray exposure and defining the scan area are performed for each scan.

20. The method as claimed in claim 12, wherein the structure is of a metal alloy.

* * * * *